United States Patent [19]

Shiga et al.

[11] Patent Number: 5,486,560
[45] Date of Patent: Jan. 23, 1996

[54] VARIABLE-MODULUS MATERIAL

[75] Inventors: Tohru Shiga; Yoshiharu Hirose; Akane Okada; Toshio Kurauchi, all of Aichi, Japan

[73] Assignee: Kabushiki Kaisha Toyota Chuo Kenkyusho, Aichi, Japan

[21] Appl. No.: 320,524

[22] Filed: Oct. 11, 1994

Related U.S. Application Data

[62] Division of Ser. No. 170,858, Dec. 21, 1993, abandoned.

[30] Foreign Application Priority Data

Dec. 25, 1992 [JP] Japan ..................................... 4-345875

[51] Int. Cl.$^6$ .............................. C08K 3/00; C08K 3/10; H01B 1/00
[52] U.S. Cl. ..................... 524/401; 524/406; 524/413; 524/422; 524/439; 528/380; 528/423; 528/490; 252/500; 252/518
[58] Field of Search ...................... 524/401, 406, 524/413, 422, 439; 528/380, 423, 490, 502; 252/500, 518

[56] References Cited

U.S. PATENT DOCUMENTS

| | | | |
|---|---|---|---|
| 4,072,411 | 2/1978 | Frank et al. | 353/121 |
| 4,488,987 | 12/1984 | Hocker et al. | 524/413 |
| 4,687,589 | 8/1987 | Block et al. | 252/73 |
| 4,699,804 | 10/1987 | Miyata et al. | 437/176 |
| 5,225,109 | 7/1993 | Feldhues et al. | 252/500 |
| 5,290,821 | 3/1994 | Sakurai et al. | 524/430 |

OTHER PUBLICATIONS

Japanese Laid–Open Patent Publication, No. 139639/1989 (English Abstract).
Japanese Laid–Open Patent Publication, No. 216202/1986 (English Abstract).
Japanese Laid–Open Patent Publication, No. 25316/1993 (English Abstract).
Japanese Laid–Open Patent Publication, No. 107334/1992 (English Abstract).

*Primary Examiner*—Tae H. Yoon
*Attorney, Agent, or Firm*—Oblon, Spivak, McClelland, Maier & Neustadt

[57] ABSTRACT

A variable-modulus material is composed of a polymer whose constituent unit is a thiophene or pyrrole molecule having from one to three $C_{4-12}$ alkyl side chains, or a copolymer whose constituent unit is the thiophene or pyrrole molecule and which includes in a main chain thereof a conjugated compound with a K-electron bond directly bonded to the above molecule, and at least one additive (in an amount of 0.5–20 wt % of said polymer) selected from halogens, protonic acids, and transition metal halides. It greatly decreases in modulus upon application of an electric field as low as 5–150 V/mm and restores its original modulus upon removal of the electric field. It is suitable for use as vibration dampers and shock absorbers.

14 Claims, 1 Drawing Sheet

1

VARIABLE-MODULUS MATERIAL

This is a division of application Ser. No. 08/170,858, filed on Dec. 21, 1993, now abandoned.

BACKGROUND OF THE INVENTION

1. Field of the Invention

The present invention relates to a variable-modulus material suitable for automotive parts such as strut mount, engine mount, and shock absorber as vibration dampers. It will also find use as vibration insulators for electronic balances, laser scanning microscopes, scanning tunneling microscopes, and fuel and circulating pumps. It is capable of controlling predictable or unpredictable vibrations and shocks because it changes in modulus instantaneously or in a fixed period of time.

2. Description of the Related Art

By "variable-modulus material" as used herein is meant a functional polymeric material which rapidly changes in modulus upon application of an external electric field. It undergoes a reversible modulus change as the result of conversion of electrical energy applied thereto into mechanical energy. Therefore, it absorbs externally applied vibrating energy and hence functions as a vibration damper.

Automobiles are subject to low-frequency large-amplitude vibrations (due to road bumps) and high-frequency small-amplitude vibrations (during a high-speed running). Controlling or suppressing such vibrations is necessary to improve ride comfort and maneuverability. To this end, there has been proposed a vibration-proof bushing made of a material which changes in vibration-absorbing performance according to the running conditions of the vehicle. (Japanese Patent Laid-open No. 107334/1992) There has also been proposed a material which varies in vibration-absorbing capacity upon application of an electric field (Japanese Patent Laid-Open No. 91541/1991 corresponding to U.S. application Ser. No. 26,211) or upon application of a magnetic field (Japanese Patent Laid-Open No. 25316/1993). These variable-modulus materials are polymeric materials of particle-dispersed type. They increase in modulus upon application of an electric or magnetic field which brings about the polarization of dispersed particles and the bonding of dispersed particles due to the dipole-dipole interactions between dispersed particles. There is known a suspension (electrorheological fluid) which becomes more viscous when exposed to an electric field. (Japanese Patent Laid-open Nos. 216202/1986 and 139639/1989). The electrorheological fluid also increases in apparent modulus due to the bond strength between dispersed particles which is produced by the external electric field. Therefore, it will also find use as strut mounts, engine mounts, and shock absorbers, as well as the above-mentioned automotive vibration-proof bushings.

The above-mentioned variable-modulus material of dispersed-particle type or electrorheological fluid needs a high voltage of 1–5 kV/mm for its modulus change by electric field. Such a high voltage cannot be generated by an automotive battery, whose normal voltage is 12 V or 24 V, without the help of an expensive high-voltage generator. The magnetic field-induced variable-modulus material also needs an electromagnet for its modulus change by magnetic field. Such an additional generator or electromagnet augments the production cost and complicates the structure.

The above-mentioned variable-modulus material increases in modulus (or becomes stiffer) when exposed to an electromagnetic field; however, there is an instance where it is desirable that the variable-modulus material as a vibration insulator becomes soft occasionally as required.

SUMMARY OF THE INVENTION

The present invention has been completed in view of the foregoing. It is an object of the present invention to provide a polymeric material which varies in modulus according to the amount of electrical energy applied thereto. It is another object of the present invention to provide a polymeric material which varies in mechanical properties under the influence of electric fields.

DETAILED DESCRIPTION OF THE PREFERRED EMBODIMENTS

Figure 1:
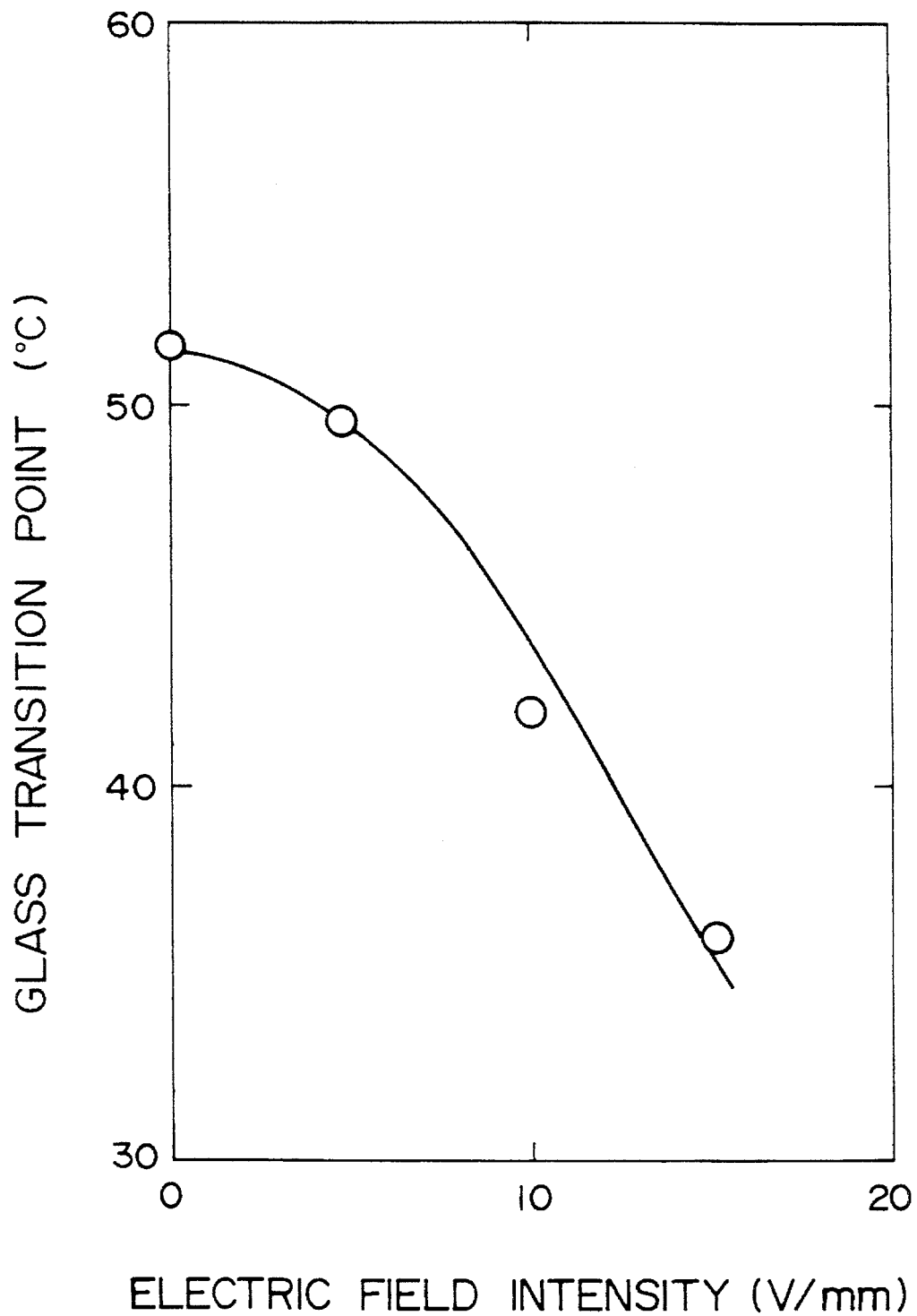
FIG. 1 is a graph showing how the variable-modulus material in Example 6 varies in glass transition point as the electric field applied thereto varies.

The variable-modulus material of the present invention comprises: a polymer whose constituent unit is a thiophene or pyrrole molecule having from one to three $C_{4-12}$ alkyl side chains, or a copolymer whose constituent unit is the above thiophene or pyrrole molecule and which includes in a main chain thereof at least one conjugated compound with a π-electron bond, directly bonded to the above molecule; and at least one additive (in an amount of 0.5–20 wt % of said polymer) selected from halogens (such as iodine and bromine), protonic acids (such as hydrochloric acid, sulfuric acid, and perchloric acid), and transition metal halides (such as molybdenum pentachloride and iron chloride).

The aforesaid polymer may be dispersed into a rubber or resin, such as silicone elastomer, polyisoprene, polystyrene, poly(methyl methacrylate), polyester, and nylon.

According to the present invention, the variable-modulus material comprises: a polymer whose constituent unit is thiophene or pyrrole (which is a heterocyclic compound) having alkyl groups of a chain of a specific length, or a copolymer which includes a heterocyclic compound, an aromatic compound, or a compound with a K-electron bond, said compound being conjugated with the thiophene or pyrrole; and at least one additive (mentioned above) adsorbed thereto.

The aforesaid polymeric composition may be dispersed into any known elastomer or resin to yield the variable-modulus material.

Examples of the aforesaid polymer include poly-(3-alkylthiophene), poly(3-alkylpyrrole), poly(3-alkylthienylenevinylene), poly(3-alkylthienylenephenylene), and poly(3-alkylthienylenealkoxyphenylene). The polymer may have as a comonomer thiophene or pyrrole having at the 3-position a $C_{1-3}$ alkyl group, methoxy group, methylthio group, $C_{2-4}$ alkylsulfonic or alkylcarboxylic acid group, or halogen. The comonomer may be N-methylpyrrole, selenophene, tellurophene, or furan.

According to the present invention, the heterocyclic compound is copolymerized with the conjugated double bond compound as mentioned above. The latter should be less than an equimolar amount of the former to yield the desired variable-modulus material.

The thiophene or pyrrole compound used in the present invention has a $C_{4-12}$ alkyl group attached to the 3-position of a thiophene or pyrrole ring. The alkyl group includes butyl, pentyl, hexyl, heptyl, octyl, nonyl, decyl, and dodecyl groups.

The aforesaid polymer may contain an additive adsorbed thereto. Examples of the additive include halogens (such as iodine and bromine), protonic acids (such as hydrochloric acid, sulfuric acid, and perchloric acid), Lewis acids (such as phosphorus pentafluoride and boron trifluoride), and transition metal halides (such as molybdenum pentachloride and iron(III) chloride). Halogens such as iodine and bromine are preferable.

The additive should be used in an amount of 0.5–20 wt %, preferably 0.5–15 wt %, of the polymer. An excess more than 20 wt % would ooze out of the surface of the material.

The polymer incorporated with the additive greatly decreases in modulus due to application of an electric field. The mechanism to account for it is not clear but may be attributable to the fact that the variable-modulus material is composed of a polymer of the heterocyclic compound which forms the compact main chain and has a flexible side chain of alkyl group and an additive (such as halogen) coordinated with the K electrons of the polymer. It is conjectured that this structure permits the state of the polymer-additive bond to change (for the displacement of the alkyl side chains) as the external electric energy changes. This results in decreasing in modulus and hence glass transition point of the polymer, which leads to the vibration-damping properties.

The aforesaid polymer may be used in the form of polymer blend or polymer alloy, which is formed by dispersing the polymer in a common elastomer (such as butadiene rubber, isoprene rubber, and silicone elastomer, including swollen gels thereof) or an engineering plastic (such as poly(methyl methacrylate), polystyrene, polycarbonate, and nylon). The amount of the polymer in the polymer blend or polymer alloy should be more than 20% to yield the desired variable-modulus material.

The variable-modulus material of the present invention changes in modulus upon application of a DC voltage or AC voltage (1 kHz or less) higher than 2 V/mm. The mechanism of modulus change is not clear but may involve the weakening of the interaction between the thiophene or pyrrole ring and the additive by an electric field, which makes the main chain of the polymer less rigid and less compact and also makes the alkyl group attached to the thiophene or pyrrole ring more mobile.

The variable-modulus material of the present invention is composed of a polymer (such as poly(3-alkylthiophene) and poly(3-alkylpyrrole) and an additive (such as halogen, protonic acid, and transition metal halide) attached thereto. Surprisingly, it greatly decreases in modulus upon application of a very weak electric field and it restores its original modulus as soon as the electric field is removed. Moreover, it retains its changed modulus while an electric field is applied continuously. It gets soft upon application of an electric field, unlike many of the conventional variable-modulus materials which get hard upon application of an electric field. Therefore, it is useful as a vibration-damping material. In addition, it may be incorporated into an engineering plastic to modify its modulus. It responds to the applied electrical energy over a broad temperature range from −50° C. to 120° C., with a decrease in modulus as well as a glass transition point.

EXAMPLES

The invention will be described in more detail with reference to the examples that follow.

The performance of the variable-modulus material obtained in each example was evaluated as follows: First, a rectangular bar is cut out of a sample. Then, it is set on a viscoelastic spectrometer (made by Iwamoto Seisakusho), with its ends coated with a silver paste which serves as electrodes. With a voltage (5 to 150 V/mm) applied across the electrodes, the test bar is given a dynamic tensile stress at a frequency of 10 Hz. In this way the storage modulus (E') is measured, and the measured value is compared with the original value (with no electric field applied) to calculate the change in modulus.

EXAMPLE 1

Crystalline poly(3-hexylthiophene) was prepared from 3hexylthiophene (23 g) by oxidation coupling reaction catalyzed by iron(III) chloride (29 g) in 150 ml of chloroform at 25° C. for 10 hours. It has a molecular weight of 64,000 and contains 0.22 wt % iron(I) chloride (as the additive). Upon application of a DC electric field of 150 V/mm at room temperature, it decreased in storage modulus (E') from 340 MPa to 148 MPa.

EXAMPLE 2

The poly(3-hexylthiophene) obtained in Example 1 was dipped in 99% sulfuric acid for several seconds, followed by air-drying at 80° C., so that it adsorbed about 1% of sulfuric acid as the additive. Upon application of a DC electric field of 50 V/mm at room temperature, it decreased in storage modulus (E') from 303 MPa to 67.9 MPa.

EXAMPLE 3

The poly(3-hexylthiophene) obtained in Example 1 was exposed to bromine vapor at room temperature so that it adsorbed 8.8% of bromine as the additive. Upon application of a DC electric field of 50 V/mm at room temperature, it decreased in storage modulus (E') from 312 MPa to 149 MPa.

EXAMPLE 4

The poly(3-hexylthiophene) obtained in Example 1 was exposed to iodine vapor at 80° C. so that it adsorbed 8.7% of iodine as the additive. Upon application of a DC electric field of 5 V/mm at room temperature, it decreased in storage modulus (E') from 312 MPa to 212 MPa. Upon application of a DC electric field of 10 V/mm at room temperature, it decreased in storage modulus (E') from 312 MPa to 59.8 MPa.

EXAMPLE 5

Upon application of an AC electric field of 10 V/mm at room temperature (with the frequency being 1 or 500 Hz), the iodine-adsorbed poly(3-hexylthiophene) obtained in Example 4 decreased in storage modulus (E') from 319 MPa to 151 MPa or 239 MPa, respectively.

EXAMPLE 6

The variable-modulus material obtained in Example 4 was tested for the temperature dependence of E' over a range from −20° C. to +100° C. It decreased in E' upon application of a DC electric field at any temperature. FIG. 1 indicates the glass transition temperature in electric fields. It is noted that the glass transition point of the sample decreased from 52° C. (with no electric field applied) to 42° C. (with an electric field of 10 V/mm applied) and further to 36° C. (with an electric field of 15 V/mm applied). This implies that it is possible to change the modulus of the material regardless of its surroundings.

EXAMPLE 7

Poly(3-octylthiophene) was prepared from 3-octylthiophene (20 g) by oxidation coupling polymerization catalyzed by iron(III) chloride (32 g) in chloroform at 25° C. It has a molecular weight of 43,000 and contains a small amount of iron(III) chloride. It was exposed to iodine vapor at 80° C. so that it adsorbed 6 wt % of iodine. Upon application of a DC electric field of 15 V/mm at room temperature, it decreased in storage modulus (E') from 180 MPa to 105 MPa.

EXAMPLE 8

A copolymer was prepared from 3-hexylthiophene and 3-methylthiophene (in a 3:1 ratio) by oxidation coupling catalyzed by iron(III) chloride in chloroform under the same conditions as in Example 7. It was exposed to iodine vapor at 80° C. so that it adsorbed 2.7% of iodine. Upon application of a DC electric field of 10 V/mm at room temperature, it decreased in storage modulus (E') from 412 MPa to 338 MPa.

EXAMPLE 9

A copolymer was prepared from 3-decylpyrrole and N-methylpyrrole (in a 4:1 ratio) by oxidation coupling catalyzed by molybdenum pentachloride in chloroform. It was exposed to iodine vapor at 80° C. so that it adsorbed 8% of iodine. Upon application of a DC electric field of 50 V/mm at room temperature, it decreased in storage modulus (E') from 450 MPa to 410 MPa.

EXAMPLE 10

Poly(3-hexylthiophene) in the form of particles about 300 Nm in diameter (which was prepared in Example 1) was caused to adsorb 10% of iodine. It was then dispersed in a solution of two-part reactive silicone gel ("SE1886" commercially available from Toray-Dow Corning Co., Ltd.) to give a 40 wt % slurry. The slurry was allowed to stand 80° C. for a week for solidification. Thus there was obtained a polymer blend composed of silicone elastomer and 40% poly(3-hexylthiophene) dispersed therein. Upon application of a DC electric field of 100 V/nun at room temperature, this material decreased in storage modulus (E') from 20 MPa to 15 MPa.

EXAMPLE 11

Poly(3-hexylthiophene) and poly(methyl methacrylate) ("Acrypet" from Mitsubishi Gas Chemical Co., Ltd.) in a 1:1 ratio were uniformly dissolved in chloroform. By removing chloroform, there was obtained a polymer blend. It was exposed to iodine vapor at 80° C. so that it adsorbed 6% iodine. Upon application of a DC electric field of 50 V/mm at room temperature, it decreased in storage modulus (E') from 650 MPa to 480 MPa. This shows that a polymer blend of poly(3-hexylthiophene) and poly(methyl methacrylate) decreases in modulus as in the case of straight polymer.

EXAMPLE 12

Poly(3-dodecylthiophene) and polystyrene ("Torpolex" from Mitsui Toatsu Chemicals, Inc.) in a 1:4 ratio were uniformly dissolved in chloroform. By removing chloroform, there was obtained a polymer blend. It was exposed to iodine vapor at 80° C. so that it adsorbed 5% iodine. Upon application of a DC electric field of 50 V/mm at room temperature, it decreased in storage modulus (E') from 836 MPa to 778 MPa. This shows that a polymer blend of poly(3-dodecylthiophene) and polystyrene decreases in modulus as in the case of straight polymer.

EXAMPLE 13

Amorphous poly(3-hexylthiophene) was prepared by electrochemical polymerization (with a constant current of 1 mA/cm$^2$) from 3-hexylthiophene (10 g) which was dissolved together with tetrabutylammonium tetrafluoroborate (2 g) in 200 ml of nitrobenzene. It has a molecular weight of 81,000. It was exposed to iodine vapor at 80° C. so that it adsorbed 14.8 wt % iodine. Upon application of a DC electric field of 8.7 V/mm, it decreased in storage modulus (E') from 1630 MPa to 1410 MPa at −50° C. and from 828 MPa to 87 MPa at room temperature.

COMPARATIVE EXAMPLE 1

A flat plate of particles-filled silicone elastomer was prepared by heating a mixture of 20 g of commercial two-part reactive silicone elastomer (in solution form) and 9.5 g of polymethacrylic acid cobalt salt (in the form of particles 50 µm in diameter) having 11.2% of adsorbed water. Upon application of a voltage of 2.5 kV/mm at room temperature, it increased in compression storage modulus from 5.4 MPa to 10.6 MPa.

COMPARATIVE EXAMPLE 2

Poly-p-phenylene particles were prepared by polymerization of benzene in the presence of aluminum chloride and copper chloride. A flat plate of particles-filled silicone elastomer was prepared by heating a mixture of poly-p-phenylene particles (4.2 g) and silicone elastomer solution 20 g (the same one as used in Comparative Example 1). Upon application of a voltage of 2 kV/mm at room temperature, it increased in compression storage modulus from 2 MPa to 4 MPa.

COMPARATIVE EXAMPLE 3

Polythiophene was prepared from dibromothiophene by Grignard reaction. It was then caused to adsorb 7% bromine. The resulting particles (2.2 g) were mixed with a silicone elastomer solution (10 g) (the same one as used in Comparative Example 1), followed by heating, to yield silicone elastomer. Upon application of an electric field of 2.5 kV/mm at room temperature, it increased in storage modulus from 3.2 MPa to 5.1 MPa.

The foregoing Examples 1 to 13 show that the variable-modulus material of the present invention greatly decreases in modulus upon application of an electric field as low as 5–150 V/mm and that it lowers the modulus of the resin into which it is dispersed.

As mentioned above, the present invention provides a variable-modulus material which greatly decreases in modulus upon application of an electric field as low as 5–150 V/mm and restores its original modulus upon removal of the electric field. This property is independent of the surroundings. In addition, the variable-modulus material lowers the modulus of engineering plastic into which it is dispersed. It will find use as automotive strut mounts, engine mounts, shock absorbers, and vibration-proof bushings, as well as a variety of vibration damper.

What is claimed is:

1. A method for dampening vibrations, comprising the step of applying an electric field in a manner responsive to vibrations to a variable-modulus polymer material, wherein said electric field has a strength of 5 to 150 V/mm, wherein said variable-modulus polymer material decreases in modulus upon application of an electric field.

2. A method for dampening vibrations as defined in claim 1, wherein said variable-modulus material comprises:

a polymer whose constituent unit is a thiophene molecule having from 1 to 2 $C_{4-12}$ alkyl side chains or a pyrrole molecule having from 1 to 3 $C_{4-12}$ alkyl side chains, or a copolymer whose constituent unit is said thiophene or pyrrole molecule and which includes in a main chain thereof at least one conjugated compound with a π-electron bond directly bonded to said thiophene or pyrrole molecule; and at least one additive selected from the group consisting of halogens, protonic acids, transition metal halides and Lewis acids, the amount of said additive being 0.5–20 wt. % of said polymer or copolymer, wherein said variable-modulus polymer material decreases in modulus upon application of an electric field.

3. A method for dampening vibrations as defined in claim 2, wherein the polymer or copolymer is dispersed in silicone elastomer, polyisoprene, polystyrene, poly(methyl methacrylate), polyester or nylon.

4. A method for dampening vibrations as defined in claim 2, wherein the polymer or copolymer is poly(3-alkylthiophene) poly(3-alkylpyrrole), poly(3-alkylthienylenevinylene), poly (3-alkylthienylenephenylene), or poly(3-alkylthienylalkoxyphenylene).

5. A method for dampening vibrations as defined in claim 2, wherein the copolymer has a monomer thiophene, pyrrole or N-methylpyrrole, said thiophene and pyrrole having a $C_{1-3}$ alkyl group, methoxy group, methyl thiogroup, $C_{2-4}$ alkylsulfonic or alkylcarboxylic acid group, or halogen, and said N-methylpyrrole having at the 1-position a methyl group.

6. A method for dampening vibrations as defined in claim 2, wherein the alkyl side chain is a butyl group, pentyl group, hexyl group, heptyl group, octyl group, nonyl group, decyl group or dodecyl group.

7. A method for dampening vibrations as defined in claim 2, wherein the polymer or copolymer has said halogen, protonic acid, Lewis acid or transition metal halide absorbed thereto.

8. A method for dampening vibrations as defined in claim 7, wherein the amount of the adsorbed substance is 0.5–20 wt. % of the polymer or copolymer.

9. A method for dampening vibrations as defined in claim 2, wherein said additive is selected from the group consisting of iodine, bromine, hydrochloric acid, sulfuric acid, perchloric acid, molybdenum pentachloride and iron(III) chloride.

10. A method for dampening vibrations as defined in claim 1, wherein said variable-modulus polymer material is a solid.

11. A method for dampening vibrations as defined in claim 1, wherein said variable-modulus polymer material is a rubber or resin.

12. A method for dampening vibrations as defined in claim 1, wherein said electric field is applied to said variable-modulus polymer material only when in need of dampening.

13. A method for dampening vibrations as defined in claim 2, wherein said thiophene or pyrrole molecule has one $C_{4-12}$ alkyl side chain.

14. A method for dampening vibrations, comprising the step of applying an electric field in a manner responsive to vibrations to a variable-modulus polymer material, wherein said electric field has a strength of less than 1 kV/mm, and said variable-modulus polymer material comprises:

a polymer whose constituent unit is a thiophene molecule having from 1 to 2 $C_{4-12}$ alkyl side chains or a pyrrole molecule having from 1 to 3 $C_{4-12}$ alkyl side chains, or a copolymer whose constituent unit is said thiophene or pyrrole molecule and which includes in a main chain thereof at least one conjugated compound with a π-electron bond directly bonded to said thiophene or pyrrole molecule; and at least one additive selected from the group consisting of halogens, protonic acids, transition metal halides and Lewis acids, the amount of said additive being 0.5–20 wt. % of said polymer or copolymer, wherein said variable-modulus polymer material decreases in modulus upon application of an electric field.

\* \* \* \* \*